United States Patent [19]

Jess

[11] 4,147,184
[45] Apr. 3, 1979

[54] ADJUSTABLE VALVE

[75] Inventor: Thurman S. Jess, Mundelein, Ill.

[73] Assignee: Baxter Travenol Laboratories, Inc., Deerfield, Ill.

[21] Appl. No.: 713,743

[22] Filed: Aug. 11, 1976

Related U.S. Application Data

[63] Continuation of Ser. No. 572,988, Apr. 30, 1975, abandoned, which is a continuation-in-part of Ser. No. 457,936, Apr. 4, 1974, abandoned.

[51] Int. Cl.$^2$ .................................................. F16K 5/02
[52] U.S. Cl. .............................. 137/625.47; 251/312
[58] Field of Search ........................... 251/309, 312; 137/625.16, 625.32, 625.47; 285/DIG. 22

[56] References Cited

U.S. PATENT DOCUMENTS

| | | | |
|---|---|---|---|
| 3,057,370 | 10/1962 | Hamilton | 137/625.47 |
| 3,588,149 | 6/1971 | Demler, Sr. et al. | 285/DIG. 22 |
| 3,645,547 | 2/1972 | Glover | 285/DIG. 22 |
| 3,788,599 | 1/1974 | Cloyd | 251/309 |
| 3,788,602 | 1/1974 | Kitzie | 251/312 |
| 3,853,338 | 12/1974 | Wilson | 285/DIG. 22 |
| 3,990,727 | 11/1976 | Gallagher | 285/DIG. 22 |

FOREIGN PATENT DOCUMENTS 2144373  9/1970  Fed. Rep. of Germany ........... 251/309

Primary Examiner—William R. Cline
Assistant Examiner—H. Jay Spiegel
Attorney, Agent, or Firm—John P. Kirby, Jr.; Paul C. Flattery; Garrettson Ellis

[57] ABSTRACT

A valve comprising a body including a plug receiving socket and including conduits in communication with the socket, with the body having an outwardly extending flange about the periphery of the socket, and a plug rotatably positioned in the socket whereby the plug can be rotated to register slots with the conduits to selectively control fluid flow through the conduits, the plug including a flange portion about the flange of the body wherein the flange on the body includes an upper bearing surface and a lower gripping surface, and the flange portion of the plug includes an upper gripping surface corresponding to the lower gripping surface of the flange on the body, whereby insertion of the plug in the socket causes the upper bearing surface to flex outwardly the flange portion of the body and the upper gripping surface constantly urges the lower gripping surface toward a sealing relationship with the plug in the socket.

15 Claims, 9 Drawing Figures

ADJUSTABLE VALVE

CROSS REFERENCE TO RELATED APPLICATION

This application is a continuation of application Ser. No. 572,988 filed Apr. 30, 1975, which, in turn, is a continuation-in-part of co-pending application Ser. No. 457,936, filed Apr. 4, 1974 both now abandoned.

BACKGROUND OF THE INVENTION

This invention concerns a valve or stopcock which can be adjusted to selectively control the flow of fluid from two or more fluid sources. Generally, valves of this type comprise a valve body into which is fitted a rotatable plug. Arms or conduits extend outwardly from the valve body and can be placed in communication with fluid sources. Slots or passageways in the plug are registrable with any two or more of the conduits at any one time to thereby control fluid flow through these conduits. The plug passageways can also be rotated to a position to prevent all fluid flow through the valve body conduits.

Valves of this nature have found many hospital and medical uses. A typical use, for example, is where one of the valve conduits goes, via appropriate tubing directly to a patient's bloodstream. Another conduit is connected to a parenteral solution and a third conduit may be connected to a syringe, a manometer, a second solution, medication, blood or plasma. Such an arrangement is commonly used during surgery, preoperative care, post-operative care, and in other patient care situations requiring infusion of fluids intravenously. Frequently, the patient is continuously infused with a parenteral solution. Thus, the valve plug is rotated to a position where the parenteral solution conduit is in communication with the conduit leading to the patient. During surgery and other patient care situations it is sometimes desirable to inject into the patient a medication such as, in addition to the parenteral solution, an anesthetic or muscle relaxer. To accomplish such an injection with this type of valve, the plug is rotated in the valve body to either cut off the flow of parenteral solution while the medication is injected or to simultaneously inject the medication and the parenteral solution. Once the medication had been completely administered, the valve plug was again rotated to a position where only the parenteral solution is in communication with the patient's bloodstream.

Problems which have been experienced with such valves include cracking of the valve body, cracking of the plug, separation of the plug from the valve body, leakage of fluid at the interface of the plug and valve body, and leakage between conduits when the valve is in a closed position. Such problems can be caused by inadequacies in the design, inadequacies of the valve materials used, and/or inadequate control of material processing methods or storage.

Prior art valves utilizing thermoplastics for construction generally comprises a plug having a diameter greater than the valve body socket with which it is mated. The larger diameter plug creates an interference fit between the plug and valve body socket and is intended to prevent undesirable leakage of fluids.

The interference fit results in compressive forces acting on the plug and tensile forces acting on the valve body. If such forces are great enough, cracking of the plug and/or valve body can occur, or the plug can be expelled from the valve body. The latter can occur if inadequate means are employed to retain the plug in the valve body, and is more apt to occur as a result of high internal pressures generated during infusion of fluids.

Cracking has been found to occur during assembly of the plug and body, at various times after assembly, and during use. Such cracking may be caused by a dimensional or physical change in the materials used, due to normal aging, exposure to high or low temperatures, exposure to radiation, or exposure to atmospheric pollutants.

To overcome cracking problems, one of the valve members (generally the plug) is made of a softer or more resilient material than the other, with the design such as to maintain compressive and tensile forces within acceptable limits.

Leakage which occurs at low pressures (below specified limits) can make such valves unacceptable for use. Such leakage may be caused by imperfections on the mating surfaces of the plug and/or valve body socket, a design deficiency which does not permit an adequate fit between the plug and valve body in the conduit area, cold flow (creep) of the plug away from the mating valve body surface in the conduit area, expansion or contraction of one member with temperature changes causing a separation of the mating surfaces in the conduit area, or a lifting of the plug in the valve body with internal pressure generated during infusion which again causes a separation of the mating surfaces in the conduit area.

Means for holding the plug in the body of prior art valves have been of a permanent or static nature. For example, a number of prior art valves have a plug which carries a flange which snaps over and under another flange on the periphery of the valve body. These interlocking flanges permanently hold the plug in the valve body and prevent it from popping out of the valve body under extreme pressure. However, since these valves do not allow for any plug movement, the plug or valve body may crack or break.

Other valves which have some space between the top of the plug and the valve body will allow the plug to move upwardly in the valve body. However, there is no structure in these valves to urge the plug back down into the valve body socket when the pressure decreases.

Some prior art valves are described in U.S. Pat. Nos. 2,832,562; 2,854,027; 2,859,932; 3,012,752; 3,048,192; 3,057,350; 3,276,472 and 3,481,367.

SUMMARY OF THE INVENTION

It is an object of the present invention to provide a valve which overcomes the foregoing disadvantages, and it is a more specific object of the invention to provide a valve in which the plug is secured in the valve in a dynamic interlocking relationship whereby a secure sealing relationship is maintained without regard to defects in the molding of the parts or dimensional variations in the parts.

These and other objects and advantages of the invention will appear more fully hereinafter, and for purposes of illustration, but not of limitation, embodiments of the invention are shown in the accompanying drawings in which.

Figure 1:
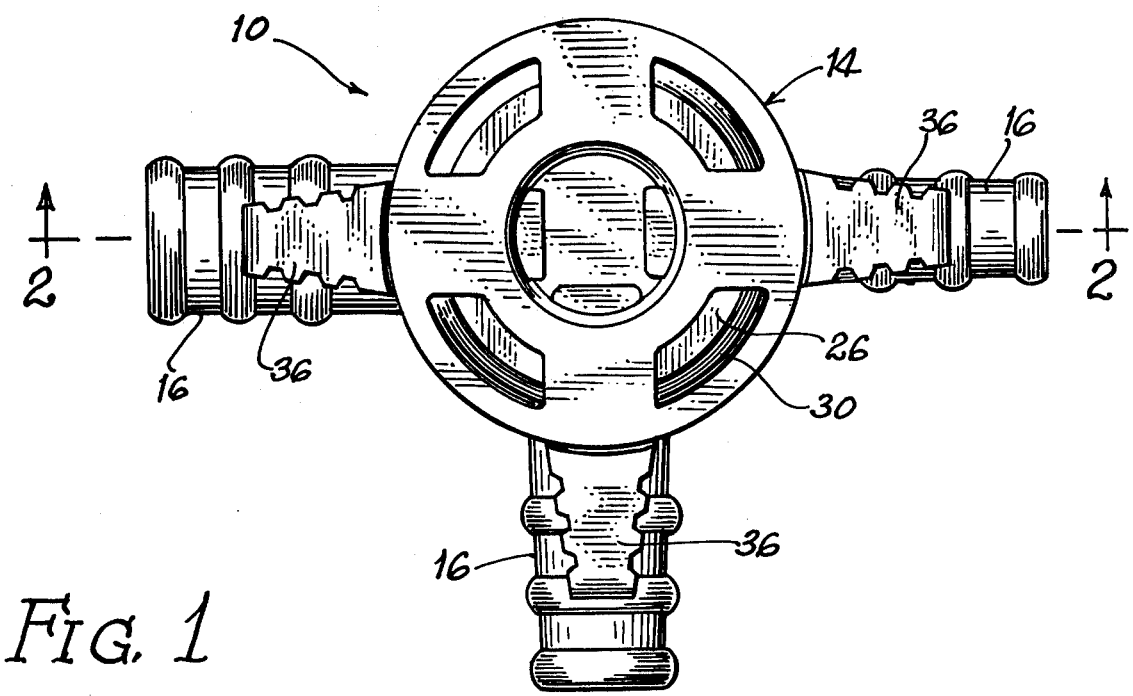
FIG. 1 is a top view in elevation of a valve embodying the features of this invention.

This invention concerns an improved valve or stopcock which is especially adapted for use in medical or hospital applications. The valve comprises a body and a plug either or both of which can be made of a relatively inexpensive plastic material by conventional plastic molding techniques.

The valve comprises a body which has a plug-receiving socket as well as outwardly extending conduits extending from the valve body. These conduits are in communication with the valve body socket. The valve body also has an outwardly extending flange at the socket mouth. The socket receives a rotatable plug. The plug has slots or passageways which are registrable with the body socket conduits. Thus, by rotation of the plug, two or more conduits can be placed in communication with each other.

One of the essential concepts of this invention is the manner in which and the means by which the plug is held in the body of the valve. A dynamic interlock between the plug and body is made possible by the interaction of a flange carried by the valve body and ears carried by the plug.

A flange on the valve body extends outwardly and tapers downwardly from the valve body socket and then tapers inwardly and downwardly back toward the valve body, merging with the valve body to form a gripping surface. The plug has extending outwardly and then downwardly from its top portion a flange. On the inner surface of this plug flange are ears which extend inwardly toward the valve body. These plug ears are adapted to slidably grip the gripping surface of the body flange and to continually pull the plug into the body socket. These ears remain in slidable contact with the gripping surface of the body flange such that the plug can be rotated in the valve body while permitting slight upward and downward movement of the plug during internal pressure changes. The forces between the plug ears and gripping surface of the body flange are such that the plug is continually being pulled into the valve body socket while acting to overcome any other internal or external forces acting on it.

The valve of this invention provides a dynamic relationship between the plug and valve body as opposed to the static relationship of the prior art where the plug is received in the body and held there by friction because it is oversized. The flanges employed on the prior art valve bodies and the ears or prongs on the plug prevent the plug from popping out of the body but do not continually pull the plug into the valve body.

Three areas where the dynamic relationship of the valve body and plug of this invention is particularly helpful are cold flow, molding defects, and dimensional variations between parts. The effects of cold flow of plastic materials that may be used to make the prior art valve body and plug cannot be overcome in the prior art valve construction because there is no structure which results in the plug being continually pulled into the body socket. Small molding defects or dimensional variations in the mating surfaces of the prior art plug and valve body socket could cause leakage. In the valve of this invention they may be overcome by the plug being continually pulled into the valve body socket.

The construction of the valve in this invention results in the valve body being held under compression. The valve body therefore has a far greater ability to resist cracking or breakage under high pressure than prior art valves.

DESCRIPTION OF THE INVENTION

Figure 2:
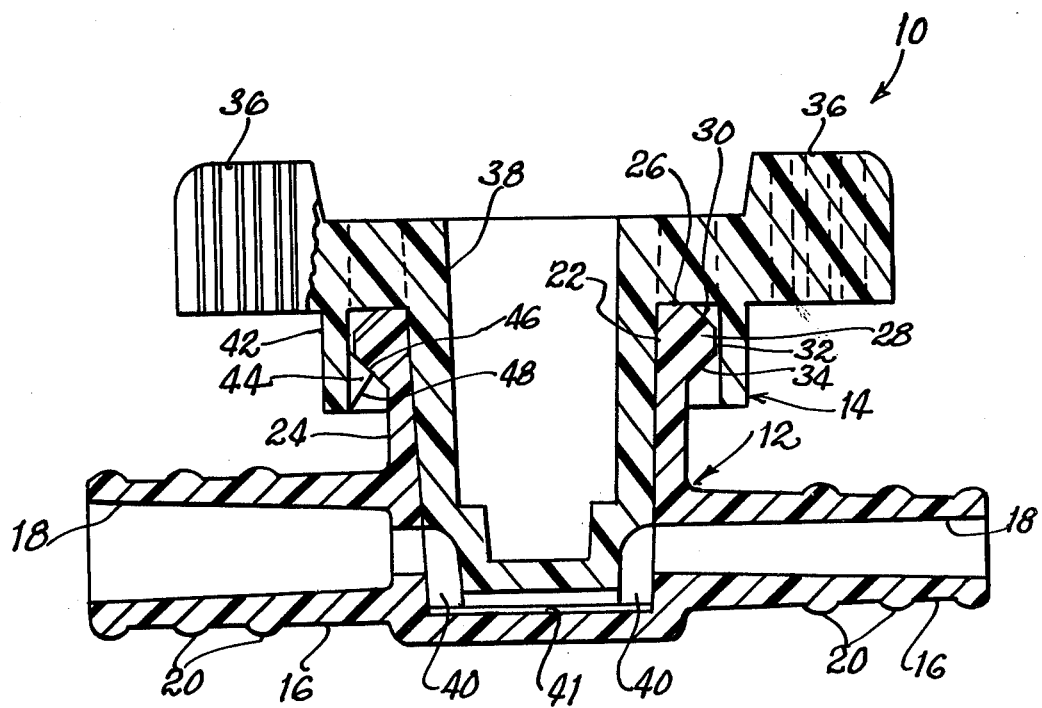
FIG. 2 is a sectional view in elevation of the valve shown in FIG. 1.

As shown in FIGS. 1 and 2 of the drawings, the valve 10 comprises a body 12 and a plug 14. Integral with the body 12 are conduits 16 which define passageways 18. The external surfaces of conduits 16 may be tapered or carry locking devices such as threads 20 to facilitate attachment of syringes or other solution-bearing equipment to the valve.

The body 12 defines a body socket 22 adapted to receive plug 14 in a sealing relationship therewith. The body socket 22 is defined by an annular tapered wall 24 terminating in an annular surface 26. The tapered wall 24 carries a peripheral flange 28 which has a generally trapezoidal configuration and which is integral with the tapered wall 24. Thus, flange 28 is bounded by a first surface 30 which extends outwardly and downwardly from the annular surface 26 at the mouth of the body socket 22, a second or peripheral surface 32 which is generally parallel to the tapered wall 24, and a third surface 34 extending inwardly and downwardly from the peripheral surface 32.

The plug 14 is adapted to be fitted in the body socket 22 of the body 12. For this purpose, the plug 14 is formed with a general T-shaped configuration, with the upper portion 36 serving as a handle for rotating the plug 14. The handle portion 36 of plug 14 is integral with an annular portion 38 having a peripheral surface corresponding to the surface of the body socket 22 to effect a sealing relation therebetween.

The plug 14 terminates at its lower portion opposite the handle portion 36 with slots or passageways 40 which can be rotated into and out of communication with conduits 16 and their respective passageways 18. As is perhaps most clearly illustrated in FIG. 2 of the drawing, when the slots 40 are in communication with the conduits 16, each of the conduits 16 is in communication with the other through the socket and specifically the bottom portion of the socket generally designated as 41 in the drawing. By the same token, however, plug 14 operates to close communication between the conduit 16 and the lower portion of socket 41 when the grooves 40 are not in alignment with the conduits 16. In general, when the body is formed with three conduits 16 as shown in FIG. 1, there are similarly provided three slots 40 for communication with each of the conduits 16 so that communication between two or more of the conduits can be assured by rotation of the handle portion 36.

Plug 14 is also provided with an annular flange portion 42 depending from the handle portion 36 and extending toward the body 12. Carried on the internal periphery of the flange 42 are inwardly extending ears 44 which are generally triangular in configuration. As will be appreciated by those skilled in the art, the ears 44 can be continuous within the periphery of the annular flange 42. It is, however, frequently preferred to provide a plurality of ears positioned about the internal periphery of the annular flange 42 to facilitate molding of the plug. The ears 44 are defined by a bearing surface 46 which extends inwardly and downwardly from flange 42, and a bearing surface 48 which corresponds to the surface 30 of the flange 28.

The interrelationship of ears 44 and body flange 28 represents one of the essential concepts of this invention. The surface 30 of flange 28 extends outwardly from the body and tapers downwardly. This facilitates insertion of the plug into the valve body as surface 30 forces or spreads the flange 42 outwardly so that the ears 44 can snap over the flange 28 and surfaces 46 of ears 44 will be in contact with gripping surface 34 of the flange. Surface 32 in combination with surface 34 which tapers inwardly from surface 32 serves as a shoulder to retain plug 14 in place.

The constant pressure exerted by ears 44 on body flange 28 continually urges or pulls the plug into the body socket. This constant pressure or pull allows the plug to adjust for cold flow of plastics if the body or plug are made up of plastic material which might deform slightly under varying temperatures. This arrangement of plug and valve body also permits the valve to compensate for small molding errors or imperfections which might cause leaks in other valves by causing the plug to be tightly held in the valve body at all times, even under stress conditions brought about due to pressure increases in the valve.

Figure 3:
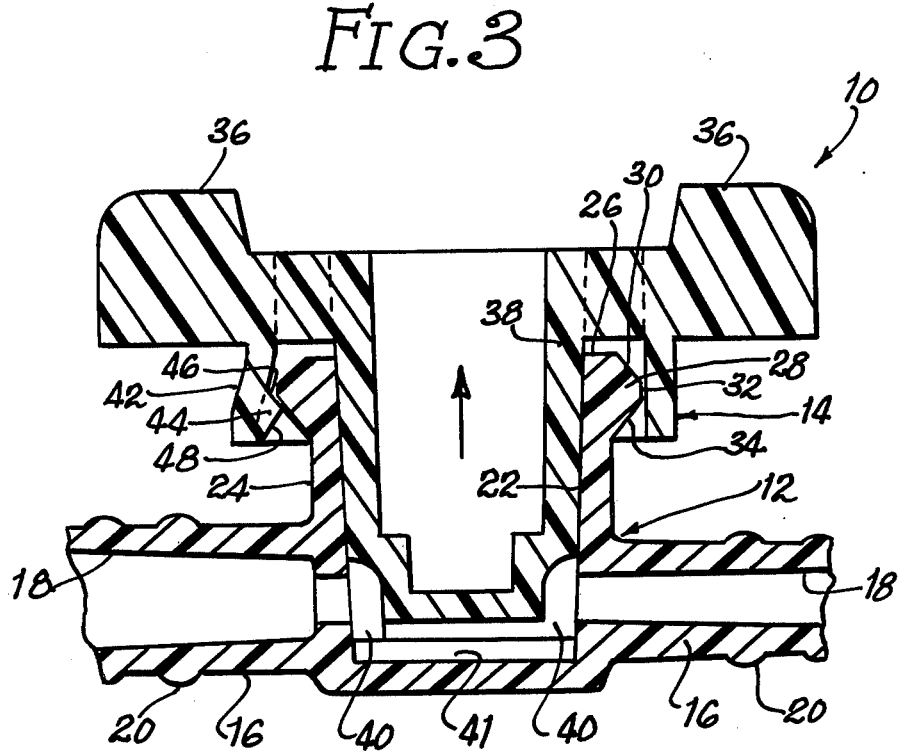
FIG. 3 is a sectional view in elevation of the valve shown in FIGS. 1 and 2 when the valve is under pressure.

The dynamic sealing relationship afforded by the present invention is shown in FIG. 3 of the drawings. FIG. 3 illustrates the same valve as depicted in FIGS. 1 and 2, except that the valve 3 is subjected to an elevated pressure in one or more of the conduits 16. As can be seen from FIG. 3, the elevated pressure in any one of the conduits 16 can be transmitted to the slots 40 to thereby cause the plug 14 to become displaced upwardly in the body socket 22. As the displacement of the plug 14 occurs, the third or bearing surface 34 of the flange 28 continuously engages the bearing surface 46 of the engaging ear 44 to constantly urge the flange 28 toward the plug 14. As soon as the elevated pressure is removed from the system, the elastic memory of the flange portion 42 of plug 14 causes the flange portion 42 to return to its original configuration as shown in FIG. 2 and thereby displace plug 14 into the body socket 22. During the time that the elevated pressure is present in the system, the seal between the plug and the body is continuously maintained because the flange 42 constantly urges the tapered wall 24 toward a sealing relationship with the annular portion 38 of the plug 14.

FIG. 3 also shows how, as spaced ears 44 are biased outwardly by plug flanges 28, only a portion of annular flange 42 is biased outwardly, with the result that there is less possibility of cracking of flange 42, when compared with structures such as that disclosed in Kitzie U.S. Pat. No. 3,788,602, in which the entire periphery of a flange analogous to flange 42 is biased outwardly upon relative axial movement between a valve body and a plug contained therein.

Figure 4:
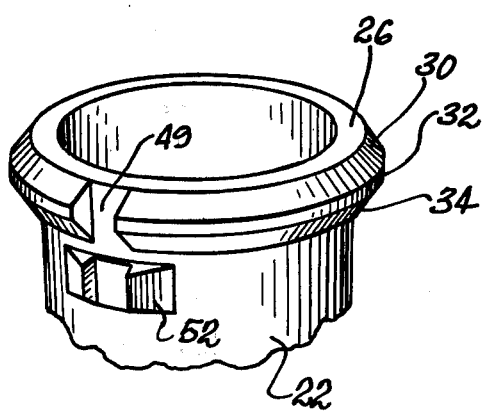
FIG. 4 is a perspective view of an alternative embodiment illustrating a flange on the body.

As will be appreciated by those skilled in the art, the flange 28 of the body 12 can be either continuous or interrupted. In a preferred embodiment of the invention, the flange 28 is formed with one or more interruptions 49 as illustrated in FIG. 4 of the drawing. the interruptions 49 can be employed as an index to indicate the relative position of the plug with respect to the conduits in communication each with the other. As is known to those skilled in the art, valves of this type are frequently sterilized using a sterilizing gas such as ethylene oxide. By providing an interruption 49 and some indicia on the plug 14 that can be matched with the interruptions 49 when all three conduits are in communication each with the other, sterilized of all three conduits by passage of the sterilizing gas therethrough can be assured.

Figure 5:
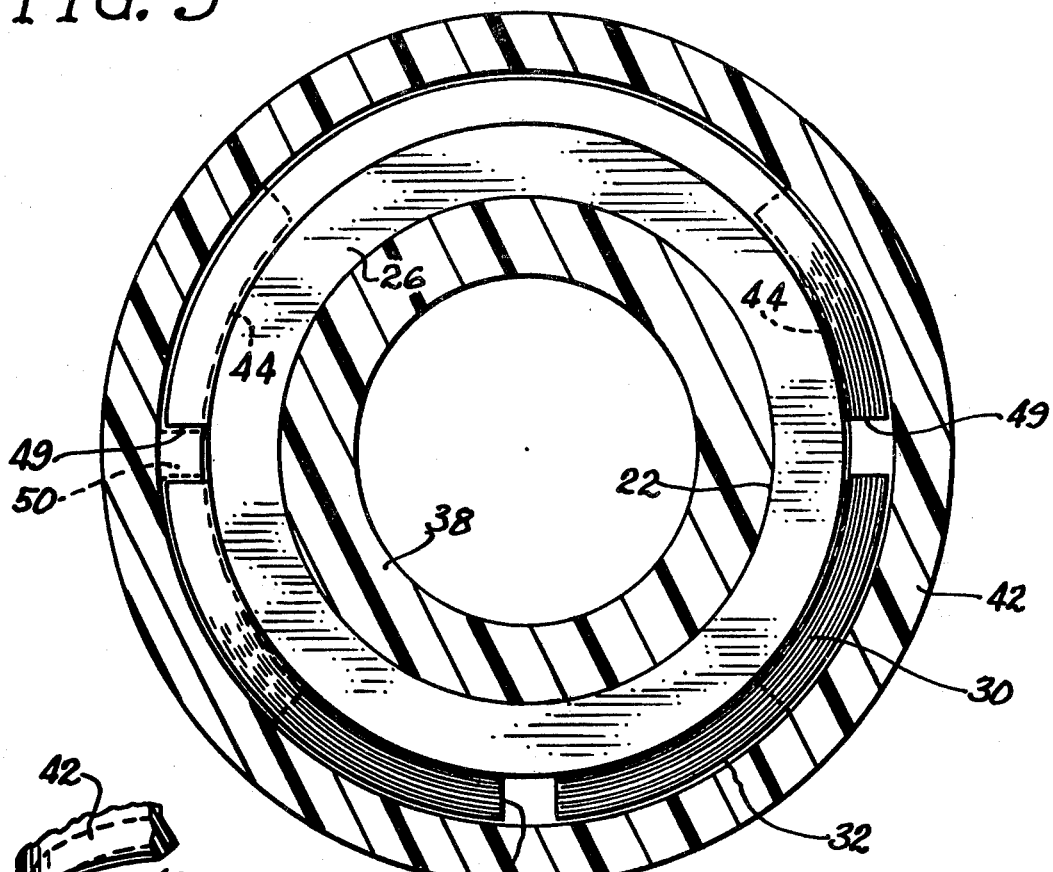
FIG. 5 is a sectional view taken along the lines 5—5 in FIG. 7.
Figure 6:
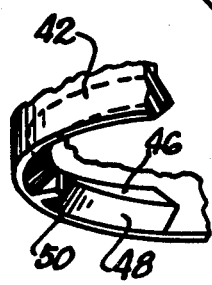
FIG. 6 is a partial perspective view of the flange of the body in accordance with an alternative embodiment of the invention.
Figure 7:
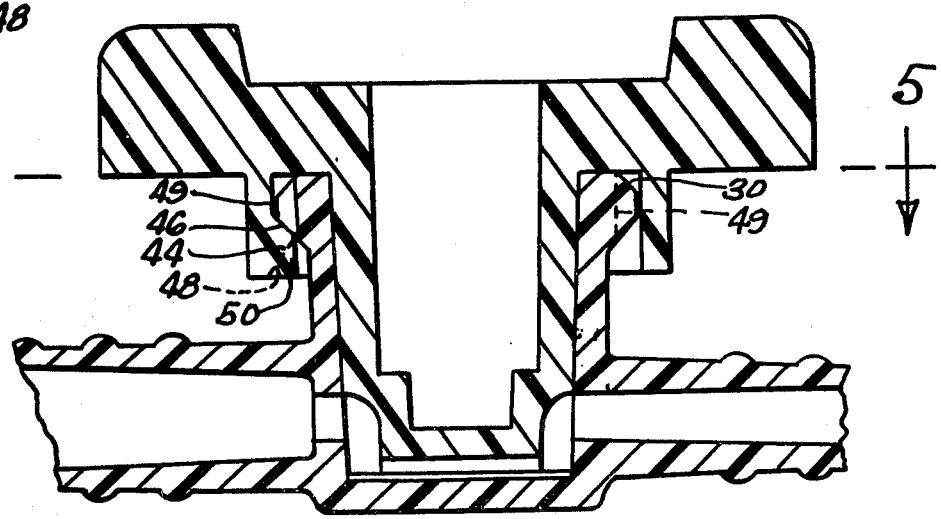
FIG. 7 is a side view in section of an alternative embodiment of the present invention.

A further alternative embodiment of the present invention is shown in FIGS. 5, 6 and 7. In this embodiment, the flange 42 as shown in FIG. 6 is provided with a projection or finger 50. The finger 50, as shown in FIGS. 5 and 7, is dimensioned to be received through the interruption 49 in the flange 28. Also in this embodiment, as is shown in FIG. 4 of the drawings, the tapered wall 24 is provided with a detent 52 adapted to engage the finger 50 as the plug upon which the finger 50 is mounted is aligned with the interruption 49 in the flange 28. The detent thus serves to secure the finger 50 and consequently plug 14 in position so that the slots 40 are locked into the desired position for communication with one or more conduits 16. As will be appreciated by those skilled in the art, more than one detent 52 can be provided, it sometimes being desirable to include one detent for each position of the plug with respect to the conduits 16.

In all embodiments, it is preferred to match indicia on the handle 36 with the position of the grooves 40 on the plug so that they are in alignment. Consequently, the indicia on the handle 36 can be matched with the conduits 16 as an indication of the position of the valve.

The valve of this invention is particularly useful when fluids under pressure are run through the valve. When this occurs in most valves the plug wants to move out of the valve body. In valves having a static plug-valve body locking relationship, the valve body or plug may crack or break under these circumstances since the plug cannot move axially in the valve body. In some prior art valves the plug might be able to move out of the valve body a certain distance due to the increased pressure. This movement may separate the mating surfaces of the plug and valve body in the conduit area and result in leakage. However, in the prior art valves (e.g. Cowley U.S. Pat. No. 3,057,350), there is no means by which the plug will be pulled back into the valve body after the pressure in the system is eliminated. In the valve of the construction of this invention, the relationship between the plug and body is dynamic rather than static. The plug ear surface 46 can slide up surface 34 in order to compensate for the greater pressures while still gripping the surface 34 and pulling the plug into the valve body.

Figure 8:
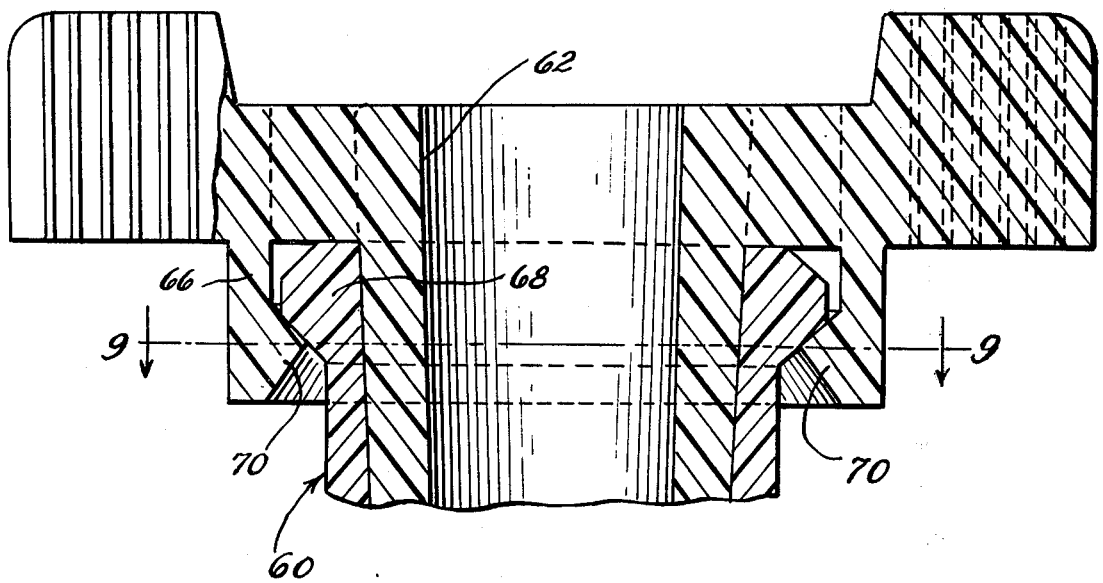
FIG. 8 is a fragmentary sectional view in elevation of another embodiment of the valve of this invention.
Figure 9:
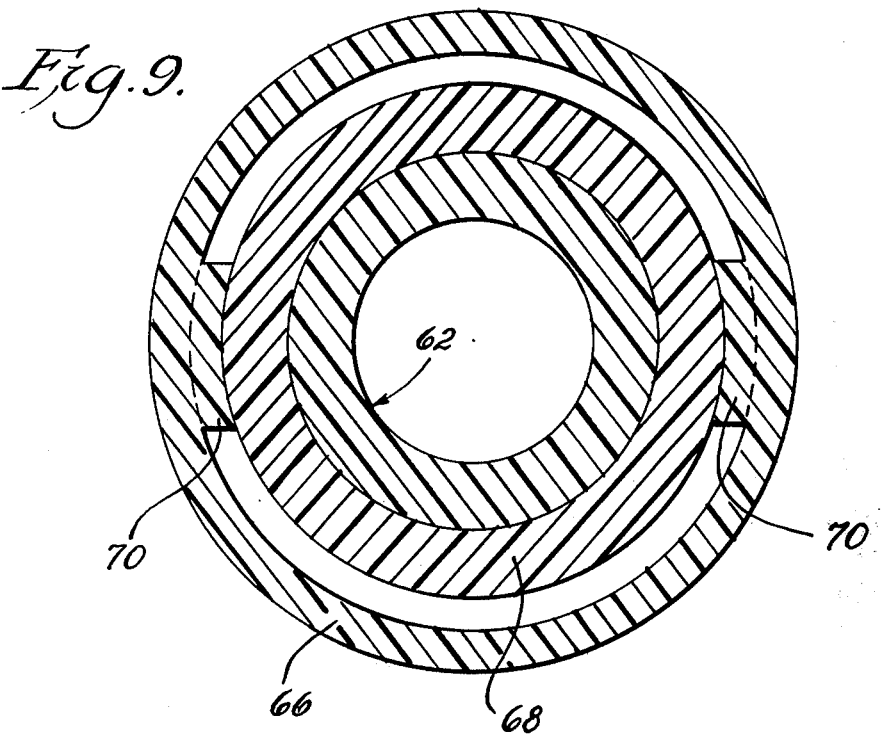
FIG. 9 is a transverse sectional view, taken along line 9—9 of FIG. 8.

FIGS. 8 and 9 disclose a valve similar to the valve of FIGS. 1 through 3, but with a different arrangement of the ears. Otherwise, the valve of FIGS. 8 and 9 is essentially identical to the valve of FIGS. 1 through 3.

As shown in FIGS. 8 and 9, the valve defines a body 60, similar to body 12 of the previous embodiment, and a plug 62, which is generally similar to the previous plug 14. Annular flange 66 of plug 62 is similar to flange 42, while peripheral flange 68 is similar to flange 28 in the previous embodiment.

The pair of ears 70 may each be of a cross sectional shape similar to ears 44, and are circumferentially positioned on flange 66 to be 180° apart from each other, as shown in FIG. 9.

Accordingly, when plug 62 is forced upwardly with respect to body 60, due to hydrodynamic pressures in the valve or the like, ears 70, like ears 44, will be forced outwardly, and the natural resilience of flange 66 will tend to bias plug 62 downwardly, for return of the plug into its normal position when the hydrodynamic overpressure ceases.

It can be seen that, inherently, in the structures of this invention, those portions of flanges 42, 66 which are not adjacent their respective ears 44, 70 will not be biased outwardly upon relative axial motion of the valve parts as described above. Accordingly, less stress is placed upon flanges 42, 66 during such axial motion. In fact, it is inherently possible for the non-adjacent portions of flanges 42, 66 to spontaneously move inwardly during such axial displacement, to relieve stress on the respective flanges.

Thus, the valve of this invention has improved durability, and is capable of withstanding higher hydrodynamic stresses. It can also be more easily assembled without breakage.

It will be understood that various changes and modifications can be made in the details of construction and use without departing from the spirit of the invention, especially as defined in the following claims.

I claim:

1. In a valve comprising a body defining a plug-receiving socket and defining outwardly extending conduits in communication with the socket, said body having an outwardly extending flange about the periphery of the socket and a plug rotatably positioned in the socket, said plug having slots therein registrable with the conduits whereby rotation of the plug in the socket selectively controls fluid flow through said conduits, said plug including a flange portion about the flange of the body, the improvement wherein the flange on the body includes an upper bearing surface and a lower gripping surface and the flange portion of the plug includes spaced, inwardly extending ears, said ears defining an upper gripping surface corresponding to the lower gripping surface of the flange on the body whereby insertion of the plug in the socket causes the upper bearing surface to flex outwardly the flange portion of the plug adjacent said spaced ears, said plug flange portion being maintained in said flexed position so that the upper gripping surface constantly urges the lower gripping surface toward a sealing relation with the plug in the socket and said plug is capable of axial movement in said socket.

2. The valve as defined in claim 1 wherein at least the plug is formed of a resilient material having an elastic memory.

3. The valve as defined in claim 1 wherein the slots registrable with the conduits selectively open communication between the conduits and the socket whereby conduits are selectively communicative each with the other through the socket.

4. The valve as defined in claim 1 wherein said ear has a generally triangular configuration, with one side of the triangle opposite the flange portion defining the upper bearing surface.

5. The valve as defined in claim 1 wherein the flange on the body has a trapezoidal configuration, with two sides of the trapezoid defining the upper bearing surface and the lower gripping surface.

6. The valve as defined in claim 5 wherein the flange on the body is continuous.

7. The valve as defined in claim 1 wherein the flange on the body includes at least one interruption.

8. The valve as defined in claim 7 wherein the interruption is aligned with the plug to indicate the position of the plug relative to the conduits.

9. The valve as defined in claim 1 wherein the body defines three conduits in communication with the socket.

10. The valve as defined in claim 1 in which portions of said plug flange portion which are not adjacent said ears are not flexed outwardly.

11. In a valve comprising a body defining a plug-receiving socket and defining outwardly extending conduits in communication with the socket, said body having an outwardly extending flange about the periphery of the socket; and a plug rotatably positioned in the socket, said plug having slots therein registrable with the conduits whereby rotation of the plug in the socket selectively controls fluid flow through said conduits, said plug including a flange portion about the flange of the body, the improvement wherein the flange on the body includes an upper bearing surface and a lower gripping surface and the flange portion of the plug includes spaced, inwardly extending ears, said ears defining an upper gripping surface corresponding to the lower gripping surface of the flange on the body whereby insertion of the plug in the socket causes the upper bearing surface to flex outwardly the flange portions of the plug adjacent to said spaced ears, said plug flange portion being maintained in said flexed portion so that the upper gripping surface constantly urges the lower gripping surface toward a sealing relation with the plug in the socket and said plug is capable of axial movement in said socket, said flange on the body including at least one interruption wherein the flange portion of the plug includes at least one projection dimensioned to be received through the interruption of the flange on the body, and the body includes a detent in alignment with the interruption adapted to receive the projection whereby the projection operates to lock the plug when the projection is engaged with the detent.

12. In a valve comprising a body defining a plug-receiving socket defining outwardly extending conduits in communication with the socket; and a plug rotatably positioned in the socket, said plug having channel means therein registrable with the conduits, whereby rotation of the plug in the socket selectively controls fluid flow through said conduits; first and second flanges respectively carried by said body and said plug, said first flange carried by the body extending about the periphery of said socket, said flanges being of differing diameters and positioned in generally coaxial relationship, whereby one flange occupies a position within the other of said flanges, the inner of said flanges defining a gripping surface for bearing in sliding relation against the outer of said flanges, the improvement comprising, in combination: the outer of said flanges defining spaced, inwardly-extending ears, said ears defining gripping surfaces abutting the gripping surface of the inner flange, whereby the inner of said flanges causes the outward flexing of said spaced ears and the outer flange portions adjacent said spaced ears, to constantly urge, by interaction of the respective gripping surfaces, said plug and socket together into sealing relation, while at the same time permitting axial movement between said plug and socket.

13. The valve as defined in claim 12 in which portions of said outer flange which are not adjacent the ears are not flexed outwardly.

14. In a valve comprising a body defining a plug-receiving socket and defining outwardly extending conduits in communication with the socket, said body having an outwardly extending flange about the periphery of said socket; and a plug rotatably positioned in the socket, said plug having slots therein registrable with the conduits whereby rotation of the plug in the socket selectively controls fluid flow through said conduits, said plug including a flange portion about the flange of the body, the improvement wherein the flange on the body includes an upper bearing surface and a lower gripping surface, and the flange portion of the plug carries a pair of spaced, inwardly extending ears, said ears being positioned in opposite relation to each other and defining an upper gripping surface corresponding to the lower gripping surface of the flange on the body, whereby insertion of the plug in the socket causes the upper bearing surface to flex the flange portion of the plug outwardly adjacent said spaced ears, said plug flange portion being maintained in said flexed position so that the upper gripping surface constantly urges the lower gripping surface and the plug toward a sealing relation with the socket.

15. In a valve comprising a body defining a plug-receiving socket defining outwardly extending conduits in communication with the socket; and a plug rotatably positioned in the socket, said plug having channel means therein registrable with the conduits, whereby rotation of the plug in the socket selectively controls fluid flow through said conduit; first and second flanges respectively carried by said body and said plug, said first flange carried by the body extending about the periphery of said socket, said flanges being of differing diameters and positioned in a generally coaxial relationship, whereby one flange occupies a position within the other said flange, the inner of said flanges defining a gripping surface for bearing and sliding relation against the outer of said flanges, the improvement comprising, in combination: the outer of said flanges carrying a pair of spaced, diametrically opposed, inwardly-extending ears, said ears defining gripping surfaces abutting the gripping surface of the inner flange, and positioned whereby the inner of said flanges causes the outward flexing of said spaced ears and portions of the outer flange adjacent said spaced ears, to constantly urge, by interaction of the respective gripping surfaces, said plug and socket together in sealing relation.

* * * * *